United States Patent
Gennetten

(10) Patent No.: US 6,449,398 B1
(45) Date of Patent: Sep. 10, 2002

(54) METHOD FOR CORRECTION ADJUSTMENT OF RESIZED IMAGE ASPECT RATIO MISMATCH

(75) Inventor: K Douglas Gennetten, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/334,997

(22) Filed: Jun. 17, 1999

(51) Int. Cl.⁷ .................................................. G06K 9/32
(52) U.S. Cl. ........................ 382/298; 382/283; 382/286
(58) Field of Search ................................. 382/298, 294, 382/286, 283, 305, 218, 293, 295, 209, 213, 215, 217; 355/55, 56, 60, 402, 403, 45

(56) References Cited

U.S. PATENT DOCUMENTS

| | | | | |
|---|---|---|---|---|
| 4,200,392 A | * | 4/1980 | Svatek ........................ | 355/45 |
| 4,616,926 A | | 10/1986 | DiPietro et al. .............. | 355/45 |
| 5,038,168 A | * | 8/1991 | Kurimoto et al. ............. | 355/56 |
| 5,486,895 A | * | 1/1996 | Leidig et al. ................. | 355/50 |
| 5,748,286 A | * | 5/1998 | Schindler et al. ............. | 355/40 |
| 5,838,457 A | * | 11/1998 | Umemoto .................... | 358/302 |
| 6,205,296 B1 | * | 3/2001 | Hamada et al. .............. | 396/311 |
| 6,222,613 B1 | * | 4/2001 | Haraguchi et al. ............ | 355/40 |

FOREIGN PATENT DOCUMENTS

EP        0772340 A2      5/1997    .......... H04N/1/387

* cited by examiner

*Primary Examiner*—Leo Boudreau
*Assistant Examiner*—Kanji Patel

(57) ABSTRACT

A method and apparatus for selecting a final image from an initial image wherein the final image and the initial image do not have the same aspect ration. The initial image is first resized so that the resized image has one of its dimensions equal to that of the final image. The resized image is placed at a position behind a mask having an opening, wherein the size of the opening is the same as the size of the final image and wherein the opening is substantially filled with a part of the resized image. The resize image is then moved to another position, wherein the opening is again substantially filled with a part of the resized image. The operator then selects the area of the resized image lying within the opening of the mask that he decides is the more pleasing view.

15 Claims, 5 Drawing Sheets

METHOD FOR CORRECTION ADJUSTMENT OF RESIZED IMAGE ASPECT RATIO MISMATCH

FIELD OF THE INVENTION

The present invention relates generally to photo imaging and more particularly to the resizing of photo images.

BACKGROUND OF THE INVENTION

Photo images are often captured on film having a size and aspect ratio that differs from that of desired reproductions. In particular, an image on 35 mm film is approximately 1.5"×1" with an aspect ratio of 6:4, while a common, standard reproduction of a 35 mm image is 8"×10" with an aspect ratio of 5:4. Difficulties arise when blowing up the resized 35 mm image to 8"×10" size. Since the aspect radio of the 35 mm image differs from that of the 8"×10" reproduction, it is impossible to fill the 8"×10" area without losing part of the exposed image. The problem persists with modern digital cameras. Aspect ratios of the exposure and of the reproduction remain important parameters.

The cropping of the exposed image done so as to match aspect ratios is typically performed manually by the photo-finisher based solely on his intuitive evaluation. From the customer's perspective, this cursory evaluation and decision by an essentially uninterested individual is often unacceptable.

When the magnification is performed via a software program, the magnification is typically performed with a separate pop-up dialog that allows the user to move an 8"×10" geometry around the photo and then stretch the image to fit the desired area. This process is manually intensive, requiring numerous mouse clicks in order to arrive at a final reproduction.

Thus, for the creation of a reproduction from an exposed image having a different aspect ratio, there exists a need for an improved and more automated method for the composition of the reproduction.

SUMMARY OF THE INVENTION

Photo images are often resized from that of the exposed image to a final size which has an aspect ratio different from that of the exposed image. Due to this change in aspect ratio, either a part of the final allocated size is unused or a portion of the exposed image is lost in the resizing process. The present patent document describes a method and apparatus for selecting the sub-area of an exposed image to be retained in the resized image, wherein the final image and the initial image do not have the same aspect ratio.

The initial image is first resized so that the resized image has one of its dimensions equal to that of the final image. The resized image is placed behind a mask having an opening, wherein the size of the opening is the same as the size of the final image and wherein the opening is substantially filled with a part of the resized image. The resized image is then moved to another position, wherein the opening is again substantially filled with a part of the resized image. The operator then selects the area of the resized image lying within the opening of the mask that he decides is the more pleasing view.

A primary advantage of the embodiment as described in the present patent document over prior methods is the reduction in guesswork and operator training required in resizing images. The process described herein is more automatic than previous solutions and results in the elimination of errors. Following the initial placement of the image behind the mask, only one click-and-drag operation is required.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

1. Introductory Comments

Figure 1A:
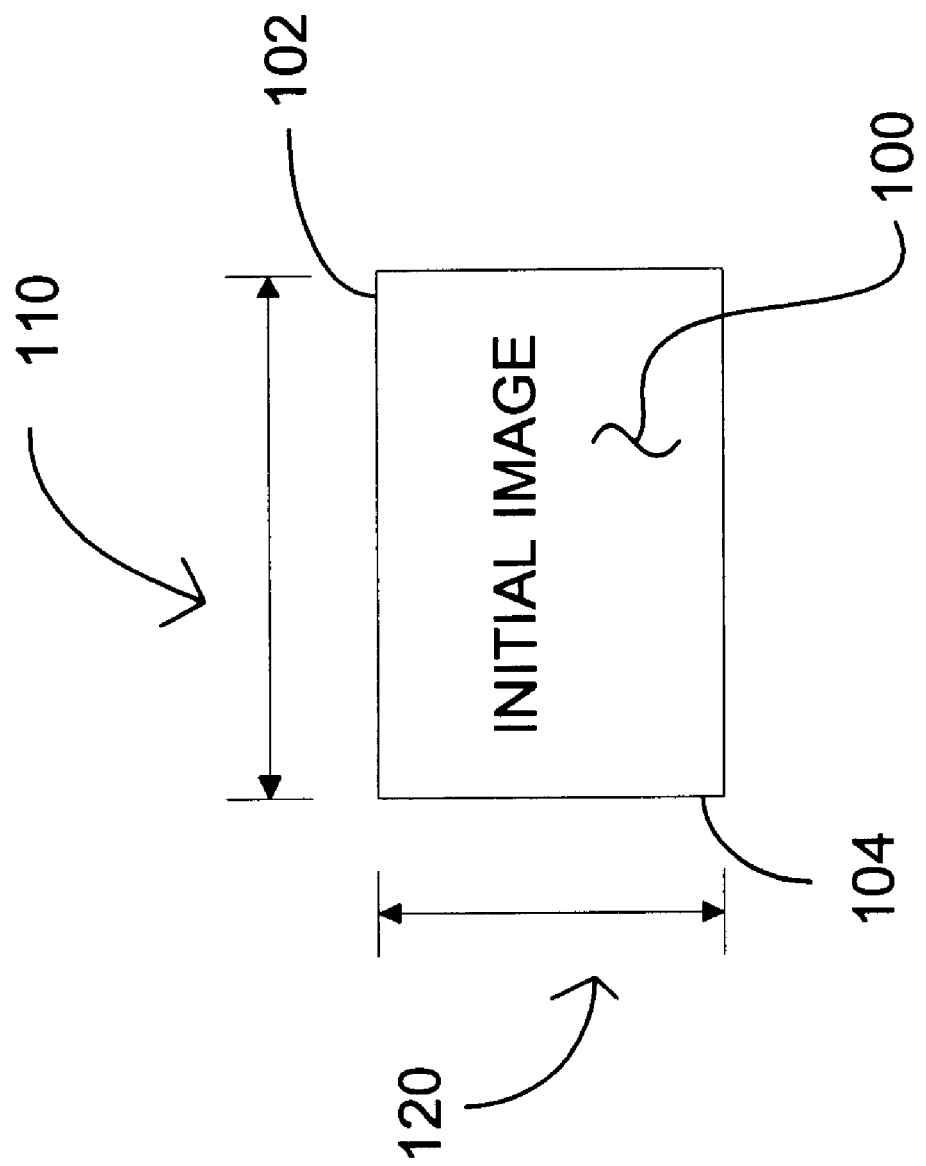
FIG. 1A is a drawing of an initial image as described in various representative embodiments of the present patent document.

Photo images are often resized from that of the exposed image to a final size which has an aspect ratio different from that of the exposed image. Due to this change in aspect ratio, either a part of the final allocated size is unused or a portion of the exposed image is lost in the resizing process. As shown in the drawings for purposes of illustration, the present patent document relates to a novel method for selecting the sub-area of an exposed image to be retained in the resized image.

In the following detailed description and in the several figures of the drawings, like elements are identified with like reference numerals.

2. Discussion

FIG. 1A is a drawing of an initial image 100 as described in various representative embodiments of the present patent document. The initial image 100 occupies an area defined by a first initial-image-side 102 having an initial image width 110 for its length and an adjacent second initial-image-side 104 having an initial image height 120 for its length. The aspect ratio of the initial image 100 is defined to be the ratio of the initial image width 110 to the initial image height 120. In an example embodiment, the initial image 100 could be an exposure on 35 mm film. In which case, the initial image width 110 would be 1.5" and the initial image height 120 would be 1", and the aspect ratio of the initial image 100 would then be 6:4.

Figure 1B:
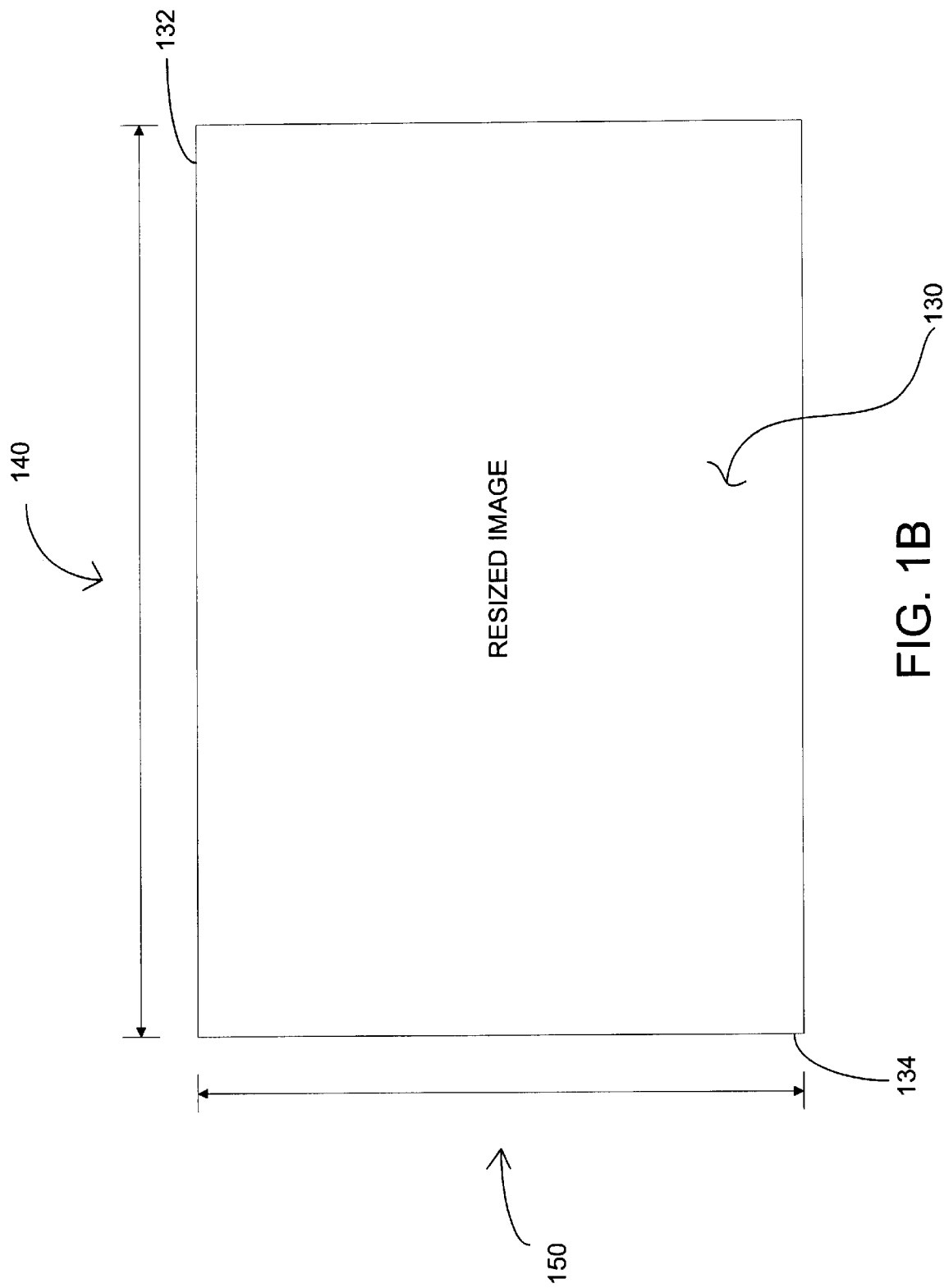
FIG. 1B is a drawing of a resized image as described in various representative embodiments of the present patent document.

FIG. 1B is a drawing of a resized image 130 as described in various representative embodiments of the present patent document. The size of the initial image 100 has been changed resulting in the resized image 130. The resized image 130 occupies an area defined by a first resized-imageside 132 having a resized image width 140 for its length and an adjacent second resized-image-side 134 having a resized image height 150 for its length. The aspect ratio of the area of the resized image 130 is defined to be the ratio of the resized image width 140 to the resized image height 150. In a continuation of the example embodiment, the resized image 130 could be a magnification of the initial image 100 exposed on 35 mm film. In this example, the resized image width 140 is 12", the resized image height 150 is 8", and the aspect ratio of the resized image 130 is 6:4 which is the same as the aspect ratio of the initial image 100 exposed on the 35 mm film.

Figure 1C:
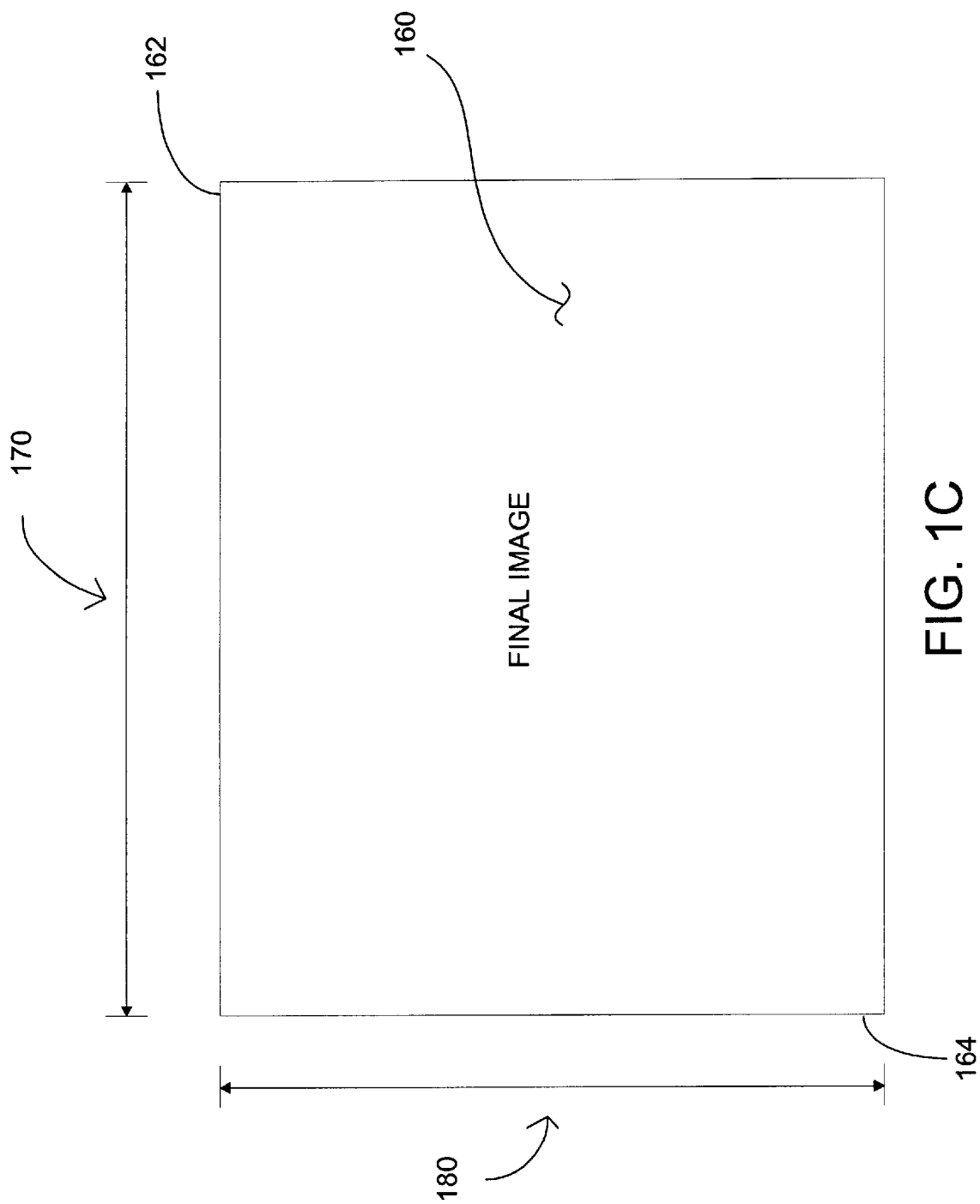
FIG. 1C is a drawing of a final image as described in various representative embodiments of the present patent document.

FIG. 1C is a drawing of a final image 160 as described in various representative embodiments of the present patent document. The final image 160 occupies an area defined by a first final-image-side 162 having a final image width 170 for its length and an adjacent second final-image-side 164 having a final image height 180 for its length. The aspect ratio of the final image 160 is defined to be the ratio of the final image width 170 to the final image height 180. In the continuation of the example embodiment, the final image 160 could be an 8"×10" photograph which is a common, standard reproduction of a 35 mm exposed image. In which case, the final image width 170 would be 10", the final image height 180 would be 8", and the aspect ratio of the final image 160 is 5:4. Note that the aspect ratio of the final image 160 is not equal to the aspect ratio of the initial image 100 or of the resized image 130. Thus, if the initial image 100 of FIG. 1A is first blown-up to the resized image 130 of FIG. 1B and then reproduced as the final image 160 of FIG. 1C, one sixth of the area of the initial image 100 is lost in reproducing the final image 160.

Figure 2A:
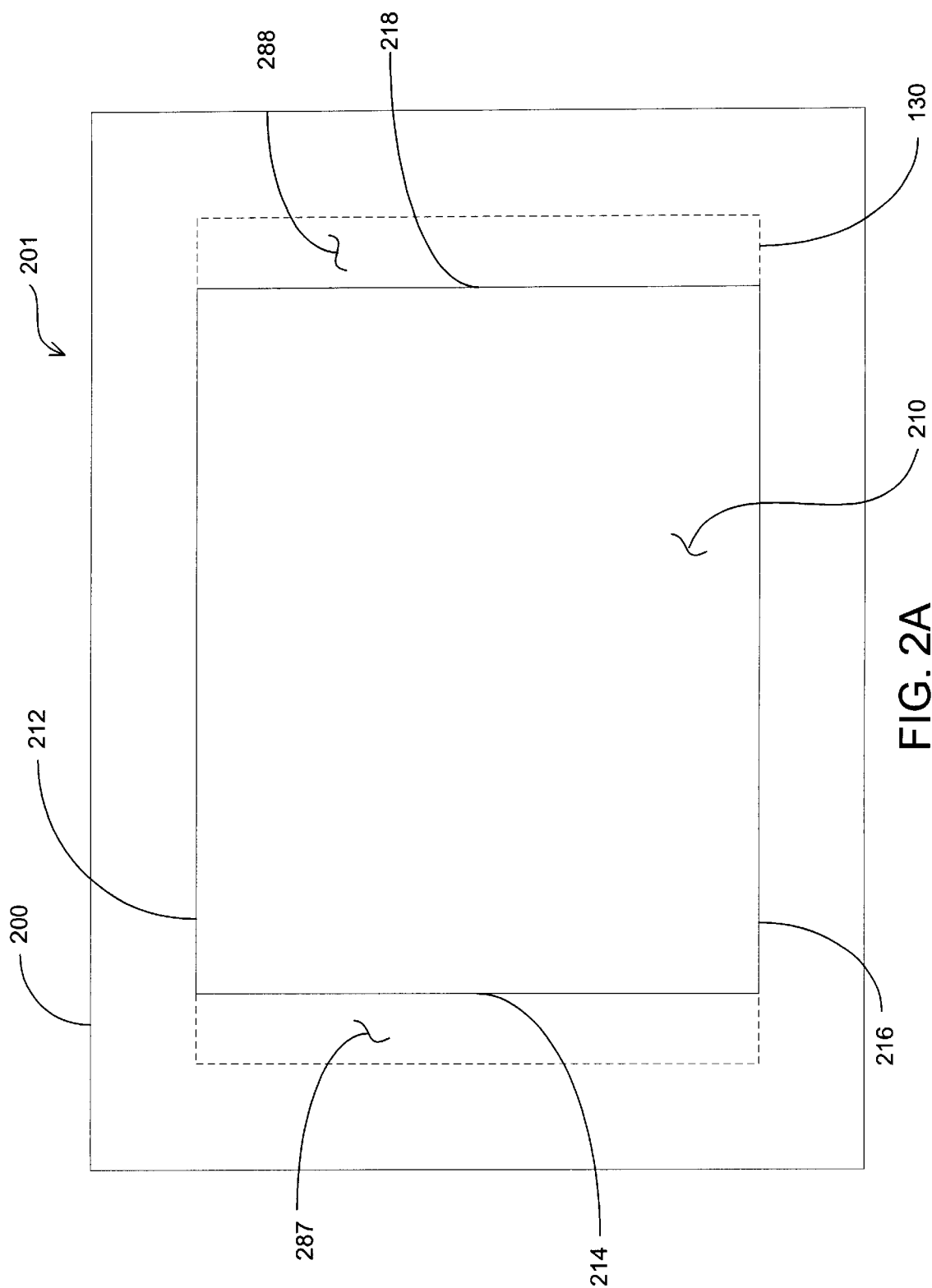
FIG. 2A is a drawing of a mask located at a first position in front of the resized image as described in various representative embodiments of the present patent document.

FIG. 2A is a drawing of a mask 200 located at a first position 201 in front of the resized image 130 as described in various representative embodiments of the present patent document. The mask 200 comprises an opening 210, wherein the opening 210 is defined by adjacent first and second opening-sides 212,214, a third opening-side 216 is located opposite the first opening-side 212, and a fourth opening-side 218 is located opposite the second opening-side 214. The first and third opening sides 212,216 are substantially equal in length to the length of the first final-image-side 162. The second and fourth opening sides 214, 218 are substantially equal in length to the length of the second final-image-side 164.

Continuing the example embodiment, the opening 210 is the same size as an 8"×10" photograph. In which case, the aspect ratio of the opening 210 is 5:4. The resized image 130 is a resized copy of the initial image 100, wherein at least one dimension of the resized image 130 is substantially equal in length to at least one dimension of the opening 210 and the corresponding dimension of the final image 160. In this example, the second resized-image-side 134 is equal in length to the second final-image-side 164 and to length of the second opening-side 214. Also, the length of the first resized-image-side 132 is greater than or equal to the length of the first final-image-side 162 and to the length of the first opening-side 212. The first final-image-side 162 is placed collinear with the first opening-side 212. A first and second areas 287,288 of the resized image 130 extend past the opening 210. First and second areas 287,288 may be either fully viewable, partially obscured, or totally obscured. Relative sizes of the first and second areas 287,288 is arbitrary, but in a first representative example the areas of the first and second areas 287,288 are equal, in a second representative example, the area of the first area 287 is zero, and in a third representative example the area of the first area 287 is greater than the area of the second area 288.

In a representative embodiment, the mask 200 is placed in front of the resized image 130, while in another representative embodiment the resized image 130 is placed behind the mask 200. Such placement could be for example by clicking on the resized image 130 with a computer mouse and then dragging the resized image 130 to the first position 201. Or alternatively, by clicking on the mask 200 with a computer mouse and then dragging the mask 200 to the first position 201.

Figure 2B:
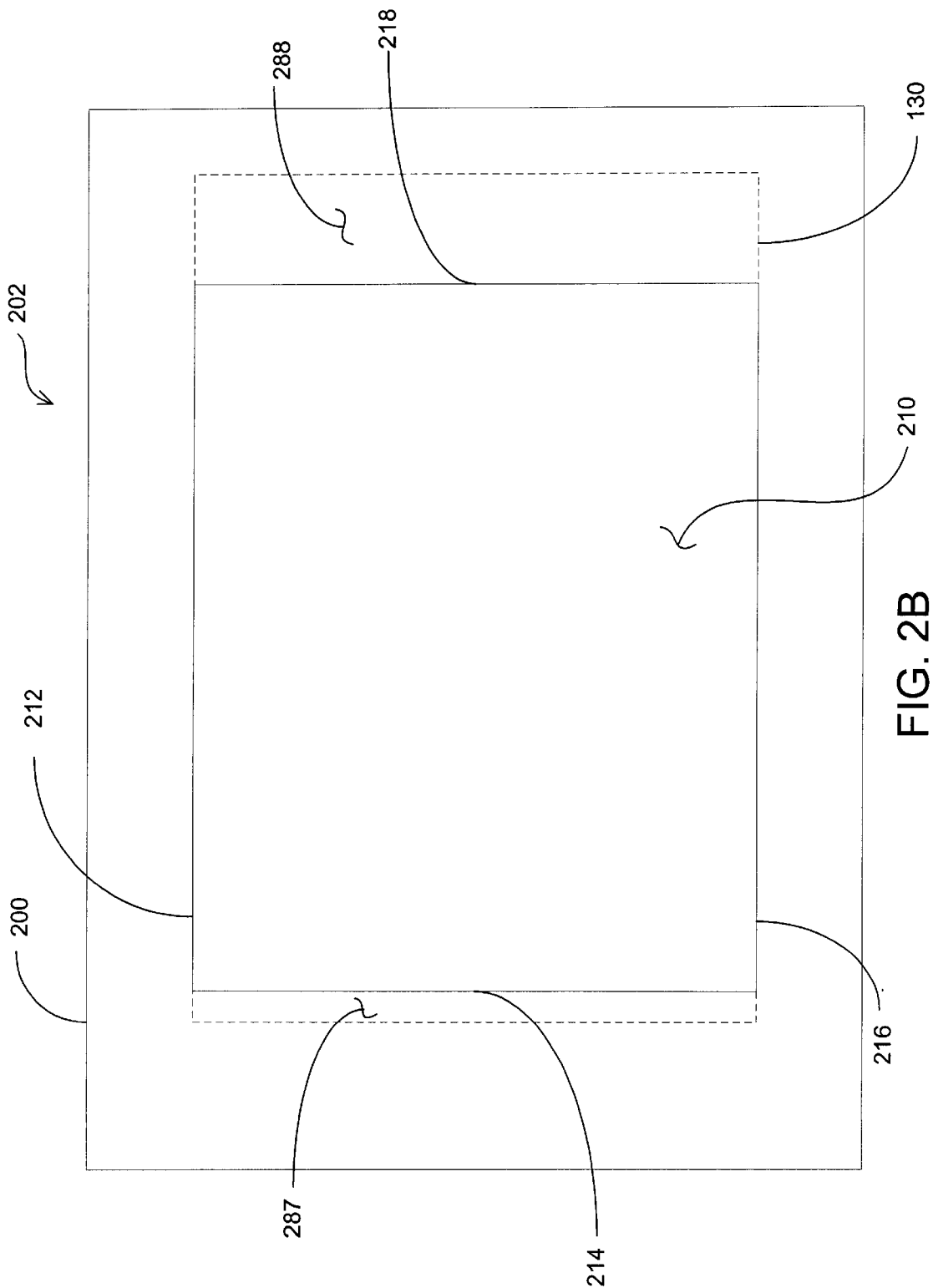
FIG. 2B is a drawing of the mask located at a second position in front of the resized image as described in various representative embodiments of the present patent document.

FIG. 2B is a drawing of the mask 200 located at a second position 202 in front of the resized image 130 as described in various representative embodiments of the present patent document. FIG. 2B is substantially identical to FIG. 2A except that the relative position of the resized image 130 with respect to the opening 210 in the mask 200 has been changed from the first position 201 to the second position 202. Note that the size of the first area 287 in FIG. 2B is smaller than it was in FIG. 2A, and the size of the second area 288 in FIG. 2B is larger than it was in FIG. 2A.

The user may then select the first position 201 or the second position 202 to define the final image 160, or he may drag the resized image 130 to other positions until he obtains a final image 160 as viewed within the opening 210 that he finds acceptable.

A primary advantage of the embodiment as described in the present patent document over prior methods is the reduction in guesswork and operator training required in resizing images. The process described herein is more automatic than previous solutions and results in the elimination of errors. Following the initial placement of the image behind the mask, only one click-and-drag operation is required.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A computer operable method for selecting a final image from an initial image, comprising:

resizing the initial image to create a resized image, wherein the resized image has adjacent first and second resized-image-sides, wherein the final image has adjacent first and second final-image-sides, and wherein length of the second resized-image-side is substantially equal to length of the second final-image-side, and wherein length of first resized-image-side is greater than length of the first final-image-side;

locating a mask in front of the resized image at a first position relative to the resized image, wherein the mask has an opening, wherein the dimensions of the opening are substantially the same as the dimensions of the final image and wherein part of the resized image occupies essentially all of the opening;

relocating the mask in front of the resized image to a second position relative to the resized image, wherein part of the resized image occupies essentially all of the opening; and selecting the area of the resized image lying within the opening of the mask to be the final image.

2. The method as recited in claim 1, providing the aspect ratio of the resized image is substantially equal to the aspect ratio of the initial image.

3. The method as recited in claim 1, wherein the method step relocating the mask in front of the resized image to the second position is performed via a click-and-drag operation with a computer mouse.

4. The method as recited in claim 1, wherein the opening of the mask has adjacent first and second opening-sides, wherein the first opening-side is collinear with the first resized-image side, and wherein the length of the second opening-side is substantially equal to the length of the second resized-image side.

5. The method as recited in claim 4, wherein the first position is such that substantially equal first and second areas of the resized image lie on opposite sides of the opening and wherein the first area is contiguous with the second opening side.

6. A computer program storage medium readable by a computer, tangibly embodying a computer program of instructions executable by the computer to perform method steps for selecting a final image from an initial image, said steps comprising:

resizing the initial image to create a resized image, wherein the resized image has adjacent first and second resized-image-sides, wherein the final image has adjacent first and second final-image-sides, and wherein length of the second resized-image-side is substantially equal to length of the second final-image-side, and wherein length of first resized-image-side is greater than length of the first final-image-side;

locating a mask in front of the resized image at a first position relative to the resized image, wherein the mask has an opening, wherein the dimensions of the opening are substantially the same as the dimensions of the final image and wherein part of the resized image occupies essentially all of the opening;

relocating the mask in front of the resized image to a second position relative to the resized image, wherein part of the resized image occupies essentially all of the opening; and selecting the area of the resized image lying within the opening of the mask to be the final image.

7. The computer program storage medium as recited in claim 6, wherein the aspect ratio of the resized image is substantially equal to the aspect ratio of the initial image.

8. The computer program storage medium as recited in claim 6, wherein the method step relocating the mask in front of the resized image to the second position is performed via a click-and-drag operation with a computer mouse.

9. The computer program storage medium as recited in claim 6, wherein the opening of the mask has adjacent first and second opening-sides, wherein the first opening-side is collinear with the first resized-image side, and wherein the length of the second opening-side is substantially equal to the length of the second resized-image side.

10. The computer program storage medium as recited in claim 9, wherein the first position is such that substantially equal first and second areas of the resized image lie on opposite sides of the opening and wherein the first area is contiguous with the second opening side.

11. A computer for selecting a final image from an initial image, comprising:

a memory containing a computer program having functions for resizing the initial image to create a resized image, wherein the resized image has adjacent first and second resized-image-sides, wherein the final image has adjacent first and second final-image-sides, and wherein length of the second resized-image-side is substantially equal to length of the second final-image-side, and wherein length of first resized-image-side is greater than length of the first final-image-side;

locating a mask in front of the resized image at a first position relative to the resized image, wherein the mask has an opening, wherein the dimensions of the opening are substantially the same as the dimensions of the final image and wherein part of the resized image occupies essentially all of the opening;

relocating the mask in front of the resized image to a second position relative to the resized image, wherein part of the resized image occupies essentially all of the opening; and selecting the area of the resized image lying within the opening of the mask to be the final image; and a processor for running the computer program.

12. The computer as recited in claim 11, wherein the aspect ratio of the resized image is substantially equal to the aspect ratio of the initial image.

13. The computer as recited in claim 11, wherein the method step relocating the mask in front of the resized image to the second position is performed via a click-and-drag operation with a computer mouse.

14. The computer as recited in claim 11, wherein the opening of the mask has adjacent first and second opening-sides, wherein the first opening-side is collinear with the first resized-image side, and wherein the length of the second opening-side is substantially equal to the length of the second resized-image side.

15. The computer as recited in claim 14, wherein the first position is such that substantially equal first and second areas of the resized image lie on opposite sides of the opening and wherein the first area is contiguous with the second opening side.

* * * * *